United States Patent
Rosner

(10) Patent No.: US 9,280,277 B2
(45) Date of Patent: Mar. 8, 2016

(54) SMART PHONE LIKE GESTURE INTERFACE FOR WEAPON MOUNTED SYSTEMS

(71) Applicant: BAE SYSTEMS OASYS LLC, Nashua, NH (US)

(72) Inventor: Brett Rosner, Windham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 166 days.

(21) Appl. No.: 13/938,281

(22) Filed: Jul. 10, 2013

(65) Prior Publication Data

US 2014/0019918 A1  Jan. 16, 2014

Related U.S. Application Data

(60) Provisional application No. 61/670,246, filed on Jul. 11, 2012.

(51) Int. Cl.
*G06F 3/033* (2013.01)
*G06F 3/0488* (2013.01)

(52) U.S. Cl.
CPC .......... *G06F 3/0488* (2013.01); *G06F 3/04883* (2013.01)

(58) Field of Classification Search
CPC ........ G06F 3/017; G06F 3/0488; F41C 27/00
USPC ....................................................... 715/863
See application file for complete search history.

(56) References Cited

U.S. PATENT DOCUMENTS

| | | | | |
|---|---|---|---|---|
| 6,899,539 B1* | 5/2005 | Stallman | ................. | F41H 13/00 345/156 |
| 7,818,910 B2* | 10/2010 | Young | ..................... | F41C 23/16 42/106 |
| 8,312,660 B1* | 11/2012 | Fujisaki | .................. | F41A 17/08 42/70.01 |
| 8,312,870 B2* | 11/2012 | Higgins | .................. | F41B 11/57 124/1 |
| 8,971,959 B2* | 3/2015 | Hunt | ..................... | F41G 11/004 455/556.1 |
| 2008/0020354 A1* | 1/2008 | Goree et al. | ..................... | 434/11 |
| 2012/0046100 A1* | 2/2012 | Roman | .................... | F41G 1/467 463/30 |
| 2012/0090216 A1* | 4/2012 | Li | ............................. | F41G 1/38 42/122 |
| 2012/0151815 A1* | 6/2012 | Tate | ..................... | F16M 11/041 42/90 |
| 2013/0225288 A1* | 8/2013 | Levin | ...................... | A63F 13/06 463/31 |
| 2014/0002680 A1* | 1/2014 | Thyssen | ............. | H04N 5/23258 348/208.99 |
| 2014/0008496 A1* | 1/2014 | Ye et al. | ........................ | 244/190 |

* cited by examiner

*Primary Examiner* — Omar Abdul-Ali
(74) *Attorney, Agent, or Firm* — Prakash Nama; Global IP Services; Daniel J. Long

(57) ABSTRACT

A smart phone like gesture based interface for controlling weapon mounted system is disclosed. In one embodiment, a gesture input is detected via the gesture based interface. One or more inputs and/or one or more outputs associated with the detected gesture interface is then identified. The weapon mounted system is then controlled based on the identified one or more inputs and/or one or more outputs.

18 Claims, 5 Drawing Sheets

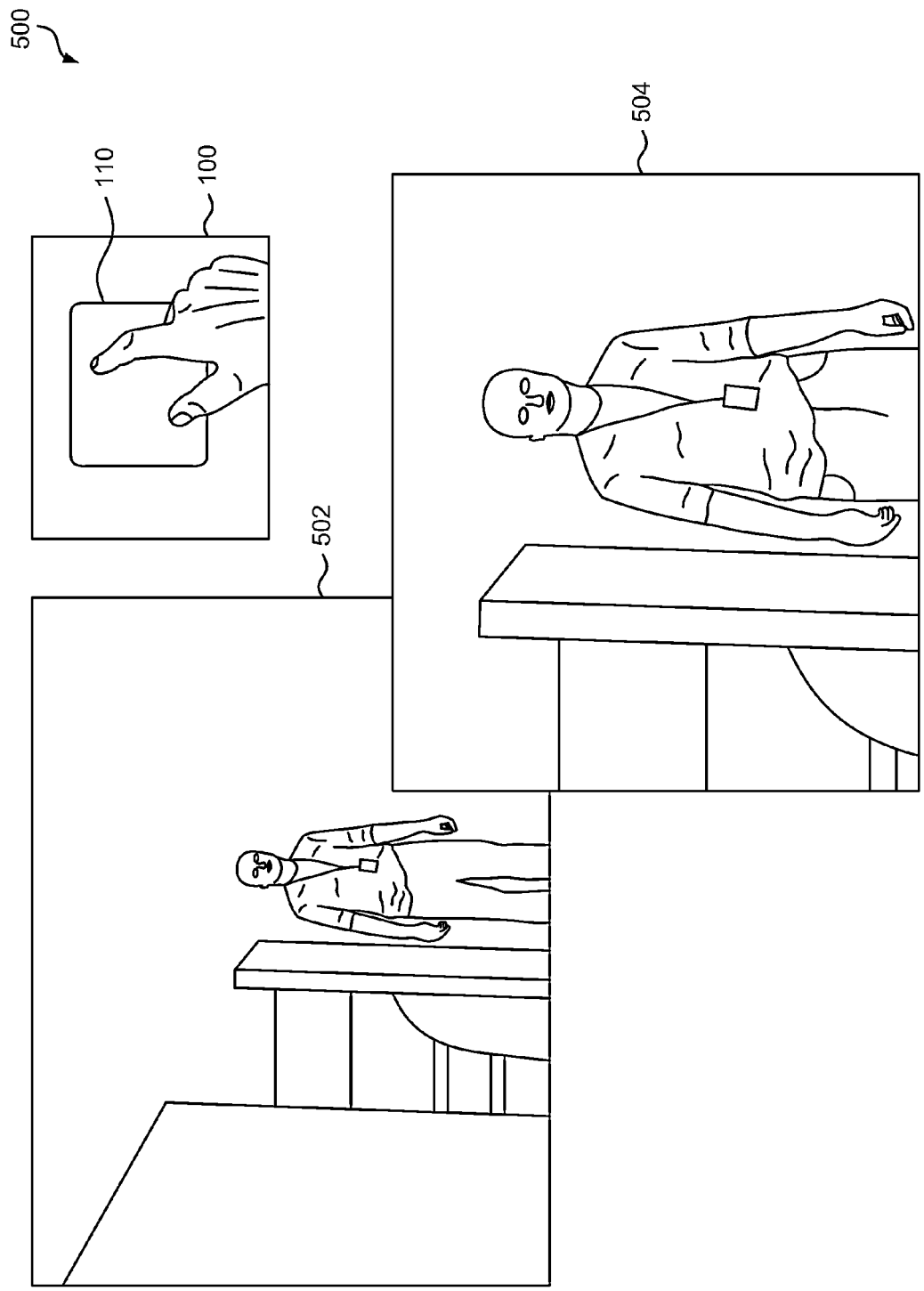

SMART PHONE LIKE GESTURE INTERFACE FOR WEAPON MOUNTED SYSTEMS

CROSS-REFERENCE TO RELATED APPLICATIONS

This Application claims rights under 35 USC §119(e) from U.S. Application 61/670,246 filed Jul. 11, 2012, the contents of which are incorporated herein by reference.

BACKGROUND OF THE INVENTION

1. Field of the Invention

The present invention relates to user interface and more particularly to user interface for weapon mounted systems.

2. Brief Description of Related Art

Typically, modern weapon mounted systems have user interfaces having many inputs and outputs. Example inputs are infrared imagery, one or more buttons, knobs, multi-position switches with potentially multi-level menu systems, one or more remote interfaces, one or more communications connectors and the like. Similarly, example outputs are a laser, an eyepiece, one or more remote interfaces and communication connectors, a multi-color light emitting diode (LED). Generally, the eyepiece is very much like in a camcorder having a video display, still pictures, data, indicators and menu systems.

Such user interface having many inputs and outputs can be confusing to a user and make require a lot of time and training to learn and become accustomed to using them. Another disadvantage of these interfaces may be that the components, such as knobs, switches, buttons and the like have to be sealed and configured to meet the military environmental conditions which can be very expensive and space intensive.

SUMMARY OF THE INVENTION

Device and method for smart phone like gesture interface for weapon mounted systems are disclosed. According to one aspect of the present subject matter, the system includes a gesture interface, memory including a gesture interpreter module, and one or more processors communicatively coupled to the gesture interface and the memory and for executing instructions in the gesture interpreter module. The gesture interpreter module is configured to receive a gesture input via the gesture interface. The gesture interpreter module is further configured to interpret the gesture input as one or more gestures. Furthermore the gesture interpreter module is configured to control one or more inputs and/or outputs of the weapon mounted system based on the interpreted one or more gestures.

Another example embodiment provides a smart phone like gesture based interface for controlling weapon mounted system. In one embodiment, a gesture input is detected via the gesture based interface. One or more inputs and/or one or more outputs associated with the detected gesture interface are then identified. The weapon mounted system is then controlled based on the identified one or more inputs and/or one or more outputs.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

FIG. 5 illustrates screenshots of before and after zooming an infrared imagery, seen through the eye-piece of a weapon mounted system, such as those shown in FIG. 2, using example two finger gesture made on the smart phone like gesture interface, according to an embodiment of the present subject matter.

DETAILED DESCRIPTION OF THE INVENTION

The exemplary embodiments described herein in detail for illustrative purposes are subject to many variations in structure and design.

The terms "gesture interface" and "user interface" are used interchangeably throughout the document. Further the terms "smart phone like gesture interface" and "smart phone like gesture based interface" are used interchangeably throughout the document.

Figure 1:
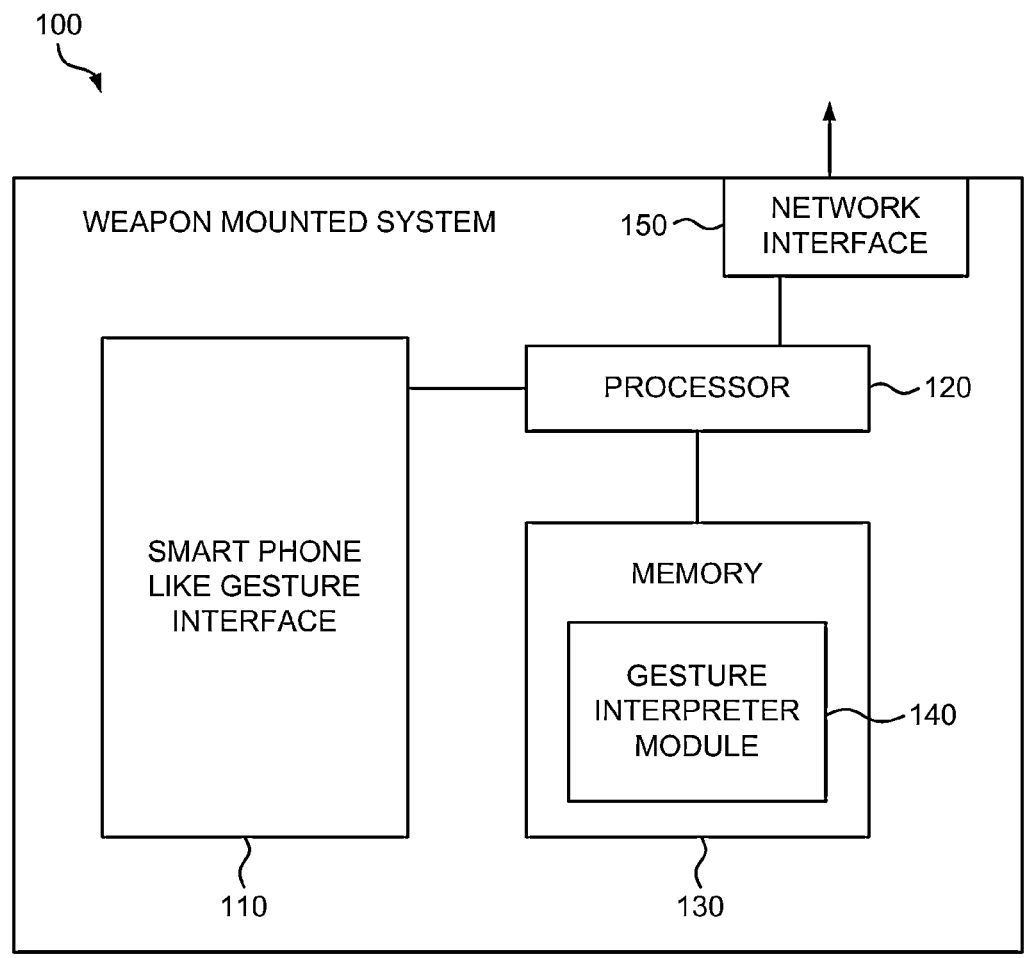
FIG. 1 illustrates an example smart phone like gesture based interface for weapon mounted systems, according to an embodiment of the present subject matter.

FIG. 1 illustrates an example weapon mounted system 100 including a gesture interface 110, according to an embodiment of the present subject matter. As shown in FIG. 1, the weapon mounted system 100 further includes a processor 120, memory 130 communicatively coupled with the processor 120. Also as shown in FIG. 1, a gesture interpreter module stored in memory 130. Further as shown in FIG. 1, a network interface 150 communicatively coupled to the processor for providing a wired or wireless remote interface. Furthermore as shown in FIG. 1, the gesture interface 110 is communicatively coupled to the processor 120.

In operation, the gesture interface 110 receives a gesture input. Example gesture interface is a smart phone like gesture interface or smart phone like touch screen configured to receive gestures. Gesture refers to any predefined movement across the gesture interface or touch screen configured to receive gesture inputs. In some embodiments, gesture refers to any predefined movement of fingers and/or hand across the gesture interface or touch screen configured to receive such gesture inputs. In these embodiments, the gesture is a swipe of a finger from center to corner of the touch screen.

The processor 120 using the gesture interpreter module 140 residing in the memory 140 interprets the gesture input as one or more gestures. In some embodiments, the one or more gestures are one or more predefined gestures.

The gesture interpreter module 140 then controls one or more inputs and/or outputs of the weapon mounted system 100 based on the interpreted one or more gestures. Example inputs are similar to input functions performed by components or devices, such as multiple buttons, knobs, switches, multi-position switch, infrared imagery, network interface communication connector and the like. Example outputs are similar to output functions performed by components or devices, such as a laser, an eyepiece, a multi-color light emitting diode (LED), a network interface, and the like.

Figure 2:
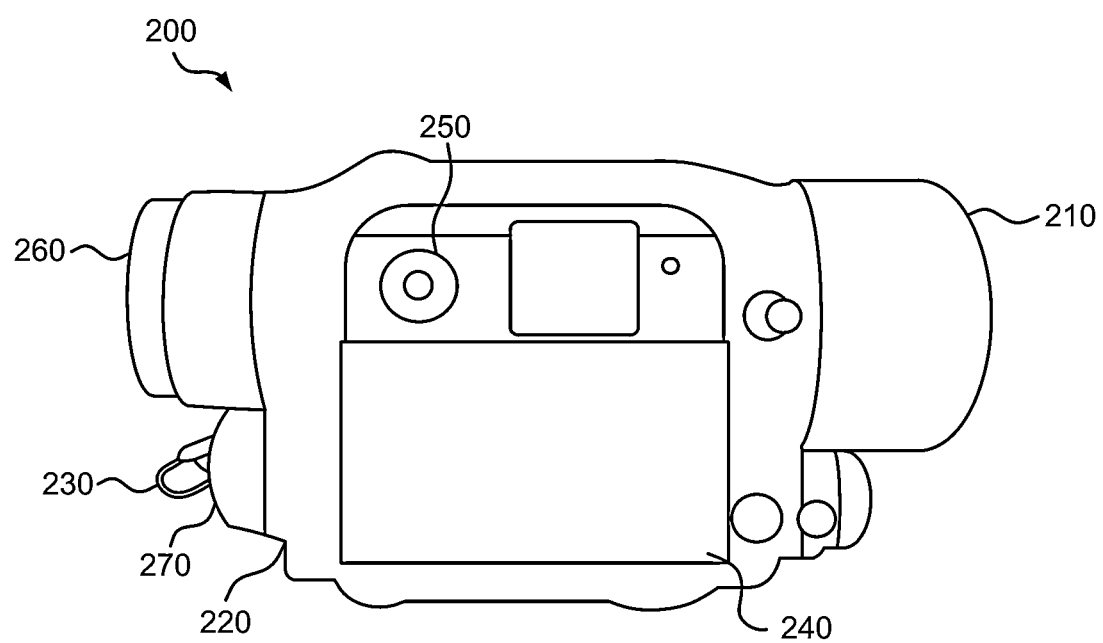
FIG. 2 illustrates an example weapon mounted system including the smart phone like gesture based interface, such as shown in FIG. 1, according to an embodiment of the present subject matter.
Figure 3:
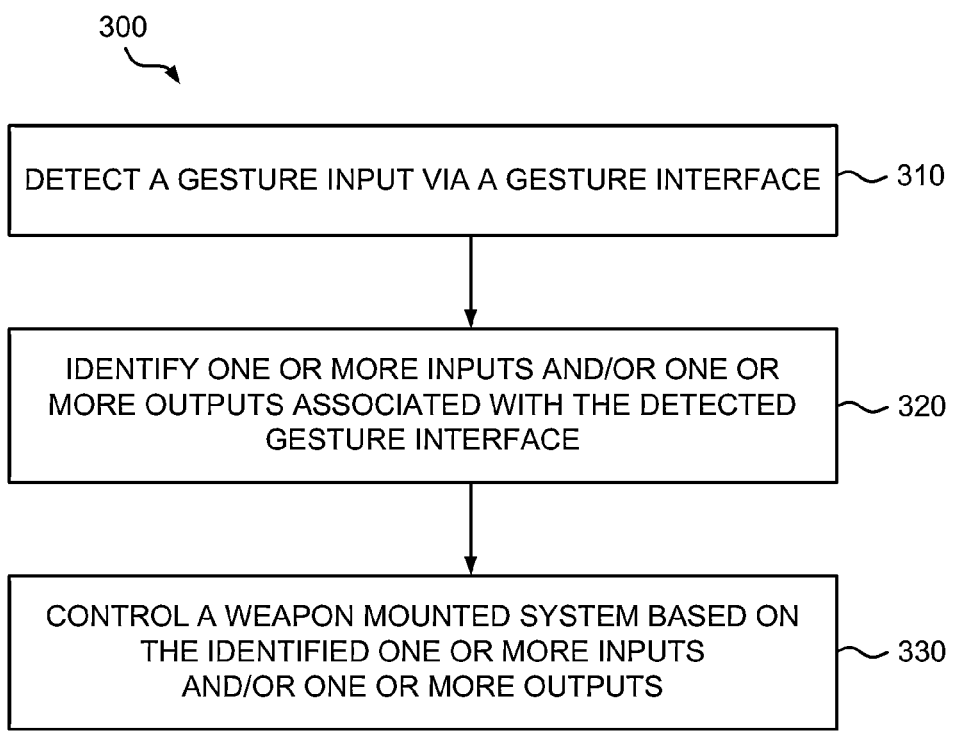
FIG. 3 illustrates a flowchart showing process of smart phone like gesture based interface for controlling weapon mounted systems, according to an embodiment of the present subject matter.

FIG. 2 shows an example weapon mounted system 200 mounted on a rifle including various input/output devices. The example weapon mounted system 200 provides infrared imagery to a viewer when mounted on a weapon, such as rifle. As shown in FIG. 2, the weapon mounted system 200 includes input devices, such as infrared imagery 210, a multi-position switch 220, a network interface and communication connector 230 and a smart phone like gesture interface 240 configured to receive user gesture inputs. Example network interface includes wired network interface and wireless network interface.

Figure 4:
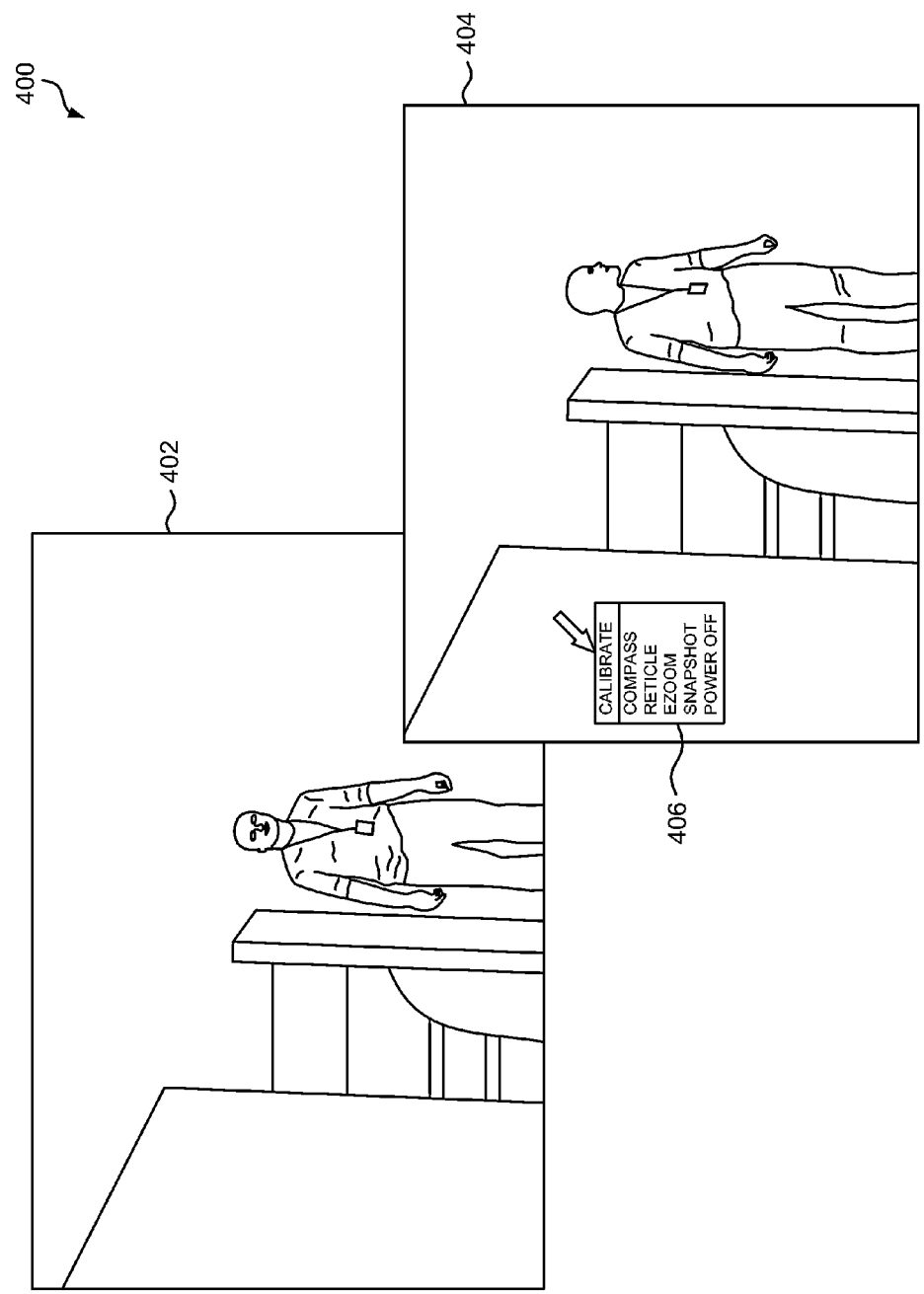
FIG. 4 illustrates screenshots of an infrared imagery viewed with and without a drop-down menu including customized commands to operate the weapon mounted system, according to an embodiment of the present subject matter

FIG. 4 shows example screenshots 402 and 404 of infrared images viewed by user before and after drop down menu 406 activation. As shown in FIG. 4, placing the cursor highlights CALIBRATE command, which can be activated with a hand gesture. For example double tapping may cause the cursor to appear on the smart phone like gesture interface 110 (shown in FIG. 1). By looking through the eye-piece of the weapon mounted system 200 (shown in FIG. 2), the viewer gets feedback similar to a person viewing a computer screen. Again, once the menu appears, double tapping on any one of the drop-down menu items can activate a desired command to operate the weapon mounted systems 200.

FIG. 5 shows example screenshots 502 and 504 of image before and after zooming, respectively. It can be seen in FIG. 5, that a hand gesture, such as moving fingers apart on smart phone like gesture interface 110, image may be doubled in size (i.e., a zoom factor of about 2).

Also as shown in FIG. 2, the weapon mounted system 200 includes output devices, such as laser fire button 250 (Note: The laser fire button is an input from the user to fire the laser. It is not an output), an eye-piece 260, a remote interface and communication connector 230 and a multi-color LED 270. One can envision that there can be any number of such other input and output devices in a weapon mounted system. In the example weapon mounted system 200, the smart phone like gesture interface 240 is configured to replace one or more buttons, knobs, multi-position switches with potentially multi-level menu systems and the like.

Although, the above weapon mounted system 200 is described with reference to an infrared imagery provided to a viewer, one can envision that the idea will work in any visible light, ultraviolet rays and other such type of sensors used in multi-sensor devices. Further, the above weapon mounted system 200 is described using memory and processors for interpreting the user interface gestures and controlling the inputs and outputs of the weapon mounted system 200, one can envision implementing above described functions of the processors and memory as field programmable gate arrays (FPGAs), application specific integrated circuits (ASICs) and the like. Furthermore, one can envision that the memory and processors can be located remotely from the weapon mounted system 200. It can also be envisioned that the remotely located processors may be configured to receive gesture inputs via network interface 150 to send the interpreted commands to the inputs and outputs of the weapon mounted system 200.

In some embodiments, the wired network interface and/or the wireless network interface may be configured to receive inputs and outputs from a detachable or external gesture pad. Further in embodiments a separate wireless gesture sensor may be configured to send gesture commands into the weapon mounting system 200 using a wireless receiver configured to receive such commands.

As shown in FIG. 2, the smart phone like gesture interface 240 may be designed to be integral, removable or external to the weapon mounting system 200. Further, the smart phone like gesture interface whether it integral, detachable or external to the weapon mounting system 200 may be configured to communicate either through the wired network interface or the wireless network interface. It can be seen that having such an external smart phone like gesture interface 240 can facilitate someone operating the weapon mounting system 200 to be safely behind a wall and see the infrared video and control the weapon mounting system 200 without exposing themselves to enemy fire or hostile environment.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A weapon mounted system mounted on a rifle and including a smart phone like gesture based interface for controlling the weapon mounted system, the weapon mounted system comprising:
    a gesture interface;
    memory including a gesture interpreter module; and
    one or more processors communicatively coupled to the gesture interface and the memory and for executing instructions in the gesture interpreter module to perform operations comprising:
    receiving a gesture input via the gesture interface, wherein gesture input is a predefined hand gesture on the gesture interface;
    interpreting the gesture input as one or more predefined commands; and
    controlling one or more inputs and/or outputs of the weapon mounted system based on the interpreted one or more predefined commands.

2. The weapon mounted system of claim 1, wherein the gesture interface is a smart phone like gesture interface.

3. The weapon mounted system of claim 1, wherein the gesture interface is a smart phone like touch screen configured to receive gesture inputs.

4. The weapon mounted system of claim 3, wherein the gesture interface is configured to receive a predefined movement of a finger or hand on the touch screen of the weapon mounted system.

5. The weapon mounted system of claim 3, wherein the gesture interface is configured to receive a predefined movement across the touch screen of the weapon mounted system.

6. The weapon mounted system of claim 4, wherein the gesture is a swipe of a finger from center to corner of the touch screen.

7. The weapon mounted system of claim 1, wherein the inputs are similar to input functions received from components selected from the group consisting of multiple buttons, knobs, switches, multi-position switch, infrared imagery, network interface and communication connector.

8. The weapon mounted system of claim 7, wherein the network interface is a wired interface or a wireless interface configured to receive inputs from an external gesture interface or touch pad.

9. A method of controlling a weapon mounted system mounted on a rifle and comprising a smart phone like gesture interface, the method comprising:
- detecting a gesture input via the gesture interface mounted on the weapon mounted system, wherein the gesture input is a predefined hand gesture on the gesture interface;
- interpreting the gesture input as one or more predefined commands;
- identifying one or more inputs and/or one or more outputs associated with the detected gesture interface based on the one or more predefined commands; and
- controlling the weapon mounted system based on the identified one or more inputs and/or one or more outputs.

10. The method of claim 9, wherein the gesture interface is a smart phone like touch screen or touch pad.

11. The method of claim 9, wherein the gesture interface comprises a predefined movement of a finger on the touch screen of the weapon mounted system.

12. The method of claim 11, wherein the gesture interface comprises a predefined movement across the touch screen of the weapon mounted system.

13. The method of claim 11, wherein the gesture is a swipe of a finger from center to corner of the touch screen.

14. The method of claim 10, wherein the inputs are similar to input functions received from components selected from the group consisting of multiple buttons, knobs, switches, multi-position switch, infrared imagery, network interface and communication connector.

15. The method of claim 14, wherein the network interface is a wired interface or a wireless interface.

16. A computer-readable storage medium including instructions that are configured, when executed by a computing system, to perform a method of controlling a weapon mounted system mounted on a weapon and comprising a smart phone like gesture interface, the method comprising:
- detecting a gesture input via the gesture interface mounted on the weapon mounted system, wherein the gesture input is a predefined hand gesture on the gesture interface;
- interpreting the gesture input as one or more predefined commands;
- identifying one or more inputs and/or one or more outputs associated with the detected gesture interface based on the one or more predefined commands; and
- controlling the weapon mounted system based on the identified one or more inputs and/or one or more outputs.

17. The weapon mounted system of claim 1, wherein the outputs are similar to output functions coming from devices selected from the group consisting of a laser, an eyepiece, a multi-color light emitting diode (LED), a video and a network interface.

18. The method of claim 10, wherein the outputs are similar to output functions coming from devices selected from the group consisting of a laser, an eyepiece, a multi-color light emitting diode (LED), and a network interface.

* * * * *